United States Patent
Guenther et al.

(10) Patent No.: US 9,845,892 B1
(45) Date of Patent: Dec. 19, 2017

(54) MULTIPLE ACTION FORCED FLUID EVACUATION SYSTEM

(71) Applicant: Hartmann Controls, Inc., Hartland, WI (US)

(72) Inventors: Henry Guenther, Elm Grove, WI (US);
Mark Blumreiter, Waukesha, WI (US);
Eric Roberts, Greendale, WI (US);
Bruce McBee, Brookfield, WI (US);
David C. Check, New Berlin, WI (US)

(73) Assignee: Hartmann Controls, Inc., Hartland, WI (US)

( * ) Notice: Subject to any disclaimer, the term of this patent is extended or adjusted under 35 U.S.C. 154(b) by 45 days.

(21) Appl. No.: 15/144,908

(22) Filed: May 3, 2016

Related U.S. Application Data

(60) Provisional application No. 62/157,573, filed on May 6, 2015.

(51) Int. Cl.
*F16K 7/07* (2006.01)
*F16L 55/07* (2006.01)

(52) U.S. Cl.
CPC .............. *F16K 7/07* (2013.01); *F16L 55/07* (2013.01); *Y10T 137/3127* (2015.04);
(Continued)

(58) Field of Classification Search
CPC ...... F16K 7/07; F06L 55/07; Y10T 137/3127; Y10T 137/7879; Y10T 137/7889; Y10T 137/86196; Y10T 137/4643
(Continued)

(56) References Cited

U.S. PATENT DOCUMENTS 2,257,072 A * 9/1941 Coombs .............. A61M 3/0241
261/18.1
4,006,762 A * 2/1977 Badger .................. B67D 7/362
137/386

(Continued)

FOREIGN PATENT DOCUMENTS

DE 102011014026 9/2012
EP 2514937 10/2012
FR 2567611 1/1986

*Primary Examiner* — Umashankar Venkatesan
(74) *Attorney, Agent, or Firm* — Andrus Intellectual Property Law, LLP

(57) ABSTRACT

A multiple action forced fluid evacuation system includes a reservoir for receiving a working fluid therein, and a shutoff valve provided in the reservoir. An outer rigid conduit and an inner flexible conduit are connected between the shutoff valve and a receiver. A processing module is provided for at least controlling pressurized gas between the outer conduit and the inner conduit, and is operatively connected to the outer conduit and the inner conduit. A nozzle has one end in fluid communication with a source of the working fluid, and an opposite end removably coupled to the receiver. The nozzle normally enables flow of the working fluid through the inner conduit to the reservoir when the nozzle is connected to the receiver until the working fluid in the reservoir activates the shutoff valve causing the nozzle to cease flow of the working fluid leaving a portion of the working fluid trapped in the receiver and the inner conduit. Removal of the nozzle from the receiver activates the processing module and causes the portion of the working fluid trapped in the inner conduit and the receiver to be completely and sequentially evacuated into the reservoir.

20 Claims, 3 Drawing Sheets

(52) U.S. Cl.
CPC .... *Y10T 137/4643* (2015.04); *Y10T 137/7879* (2015.04); *Y10T 137/7889* (2015.04); *Y10T 137/86196* (2015.04)

(58) Field of Classification Search
USPC ........................................................ 141/198
See application file for complete search history.

(56) References Cited

U.S. PATENT DOCUMENTS

| | | | |
|---|---|---|---|
| 4,007,765 A * | 2/1977 | Bellows | B60P 3/2255 137/205 |
| 4,056,965 A * | 11/1977 | Heiser | B21D 24/02 251/5 |
| 5,305,982 A * | 4/1994 | Tamari | A61M 1/0031 251/5 |
| 5,813,842 A * | 9/1998 | Tamari | F16K 7/07 417/477.1 |
| 6,102,361 A * | 8/2000 | Riikonen | F16K 7/07 251/5 |
| 6,106,506 A | 8/2000 | Abell et al. | |
| 2014/0116522 A1* | 5/2014 | Guenther | F01N 3/2066 137/10 |

* cited by examiner

MULTIPLE ACTION FORCED FLUID EVACUATION SYSTEM

CROSS REFERENCE TO RELATED APPLICATION

The present utility application relates to and claims priority to U.S. Provisional Patent Application Ser. No. 62/157,573 filed May 6, 2015, the disclosure of which is incorporated herein by reference in entirety.

BACKGROUND OF THE INVENTION

The present disclosure relates generally to a fluid conduit arrangement including an inner flexible conduit and an outer rigid conduit to remove fluid(s) from an extended segment of conduit by evacuating fluid out by force. From time to time, fluid will not be completely evacuated due to orientation of the conduit arrangement and/or related connectors.

In applications where temperatures, pressure, chemical, molecular, reactive, light sensitive, environmental and aging changes can cause viscosity or phase (i.e. liquid to solid) changes in the working fluid, it is desirable to remove the working fluid before the viscosity change or phase change occurs. This application relates to pending U.S. patent application Ser. No. 14/059,593 filed Oct. 22, 2013, now U.S. Patent Application Publication No. 2014/0116522 published May 1, 2014, which is incorporated herein by reference in its entirety. In many of the devices that incorporate the previous disclosure, there are also contingent devices connected or secured to the conduit arrangement that also need to be evacuated. For example, in the filling of certain fluids on large mobile equipment, the receiving reservoir is heated, but the on vehicle supply hose from the on vehicle fill receiver location may or may not be heated. In instances where it is not heated, certain fluids can freeze causing damage to the system and/or preventing further filling until the conduit arrangement is heated enough to return the fluid to its original fluid phase. In vehicles where the supply conduit is heated, it can require a large amount of energy to maintain a thawed fluid flow path.

In applications where the fluid is of high monetary value or shelf life dependent, it is critical to guarantee all fluid is evacuated from the conduit arrangement to the receiving vessel or reservoir. Other cases require that fluid not be allowed to reenter the supply station in order to prevent the contamination of the supply fluid source.

The present disclosure describes a method and apparatus for assuring all supply of fluid is evacuated from the conduit arrangement into the receiving reservoir. The apparatus incorporates a pressure source that is oriented in such a manner that will allow the fluid to be completely eliminated from the inner conduit. It also includes one or more of the following: a fluid sensing mechanism and pressure monitoring control system, a pump, and a sensor system to evacuate the inner conduit as well as contingent devices such as receivers, valves and couplings. The method describes the application or use of the apparatus to accomplish total evacuation of the fluids from contingent and connected devices.

SUMMARY OF THE INVENTION

The multiple action fluid forced evacuation system uses the aforementioned fluid evacuation conduit arrangement disclosed in the '522 published application, and enhances it with a processing module to ensure working fluid is completely evacuated from the conduit arrangement by a method of applying one, some or all of the following; a fluid sensor to detect if fluid remains present in the inner conduit or contingent/connected devices; a pressure sensor to monitor pressure in the outer conduit; a controllable pressure source to force the collapse of the inner conduit and force fluid in the inner conduit into the receiving reservoir; an overpressure valve (relief valve) to provide safety in the event of excessive pressure; a pressure releasing valve to relieve pressure on the inner conduit and a method using some or all of the aforementioned devices to confirm that all working fluid is completely evacuated from the inner conduit. The orientation of the contingent/connected device or devices is such that the void from the evacuated working fluid is filled with the fluid/gas (air) remaining in the contingent/connected device thus emptying the device. This working fluid is then evacuated in the same process as the original fluid. This process can be repeated as necessary until the entire system is empty. A similar process would be advantageous for hazardous, unstable, and volatile fluids or fluids with special maintenance requirements. The system prevents the requirement of the conduit arrangement being treated the same as the receiving reservoir because the working fluid as been evacuated from the inner conduit into the receiving reservoir.

In the present multiple action arrangement, the fluid conduit arrangement of the published '522 application is enhanced to include functional control of working fluids in contingent and connected devices. It also adds control functionality concerning residual working fluid removal. Following a first forced evacuation of the working fluid, the pressure surrounding the inner conduit is relieved. Air then flows from the onboard reservoir into the inner conduit. The air in the inner conduit is displaced by the working fluid from the contingent/connected devices and the working fluid settles at the lowest point in the inner conduit. The air in the contingent/connected device replaces the fluid that flowed into the inner conduit from the contingent/connected device. The outer conduit is re-pressurized forcing the working fluid into the receiving reservoir. The evacuation process is then repeated as many cycles as is required to completely evacuate the working fluid into the receiving reservoir.

In one example, the present disclosure relates to a multiple action fluid evacuation system including a reservoir for receiving a working fluid therein. A shutoff valve is provided in the reservoir. An outer rigid conduit has one end connected to the shutoff valve, and an opposite end connected to a receiver. The outer rigid conduit is in fluid communication with a pressurized gas. An inner flexible conduit is provided for conducting the working fluid therethrough. The inner flexible conduit has one end in fluid communication with the reservoir, and an opposite end connected to and in fluid communication with the receiver. The inner flexible conduit is disposed within the outer rigid conduit and is subjected to the pressurized gas in surrounding relationship therewith. A processing module is provided for at least controlling the pressurized gas to the outer rigid conduit, and is operatively connected to the outer rigid conduit and the inner flexible conduit. A nozzle is provided having one end in fluid communication with a source of the working fluid, and an opposite end is removably coupled to and in fluid communication with the receiver. The nozzle is configured to transmit signals to the processing module and to be responsive to actuation of the shutoff valve. The nozzle normally enables flow of the working fluid through the inner flexible conduit to the reservoir when the nozzle is connected to the receiver until the working fluid in the reservoir activates the shutoff valve causing the nozzle to cease flow of the working fluid from the source thereof leaving a portion of the working fluid trapped in the receiver and the inner flexible conduit. Removal of the nozzle from the receiver actuates the processing module and causes the portion of the working fluid trapped in the inner flexible conduit and the receiver to be completely and sequentially evacuated into the reservoir.

In another example, the present disclosure also contemplates a method of controlling and evacuating fluid between different locations comprising the steps of: a) providing a reservoir for receiving a working fluid therein from a supply source; b) providing a shutoff valve in the reservoir; c) providing an outer rigid conduit having one end connected to the shutoff valve, and an opposite end connected to the receiver, the outer rigid conduit being in fluid communication with a fluid source supplying pressurized gas; d) providing an inner flexible conduit for conducting the working fluid therethrough, the inner flexible conduit having one end in fluid communication with the reservoir, and an opposite end connected to and in fluid communication with the receiver, the inner flexible conduit being disposed within the outer rigid conduit and being subjected to the pressurized gas in surrounding relationship therewith; e) providing a processing module for at least controlling the pressurized gas to the outer rigid conduit, the processing module being operatively connected to the outer rigid conduit and the inner flexible conduit, and f) providing a nozzle having one end in fluid communication with the supply source of the working fluid, and an opposite end removably coupled to and in fluid communication with the receiver, the nozzle being configured to transmit signals to the processing module, and to be responsive to an actuation of the shutoff valve.

In use, the nozzle normally enables flow of the working fluid through the inner flexible conduit to the reservoir when the nozzle is connected to the receiver until the working fluid in the reservoir activates the shutoff valve causing the nozzle to cease flow of the working fluid from the supply source thereof leaving a portion of the working fluid trapped in the receiver and the inner flexible conduit. Removal of the nozzle from the reservoir actuates the processing module and causes the portion of the working fluid trapped in the inner conduit and the receiver to be completely and sequentially evacuated into the receiver.

In a first evacuation action, the processing module causes the pressurized gas to be delivered to the outer rigid conduit such that the portion of the working fluid trapped in the inner flexible conduit is forced into the reservoir. In a second evacuation action, the portion of the working fluid trapped in the receiver flows to a lowest point in the inner flexible conduit, and the processing module again causes the pressurized gas to be delivered into the outer rigid conduit such that the portion of the working fluid in the lowest point of the inner flexible conduit is forced into the reservoir.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
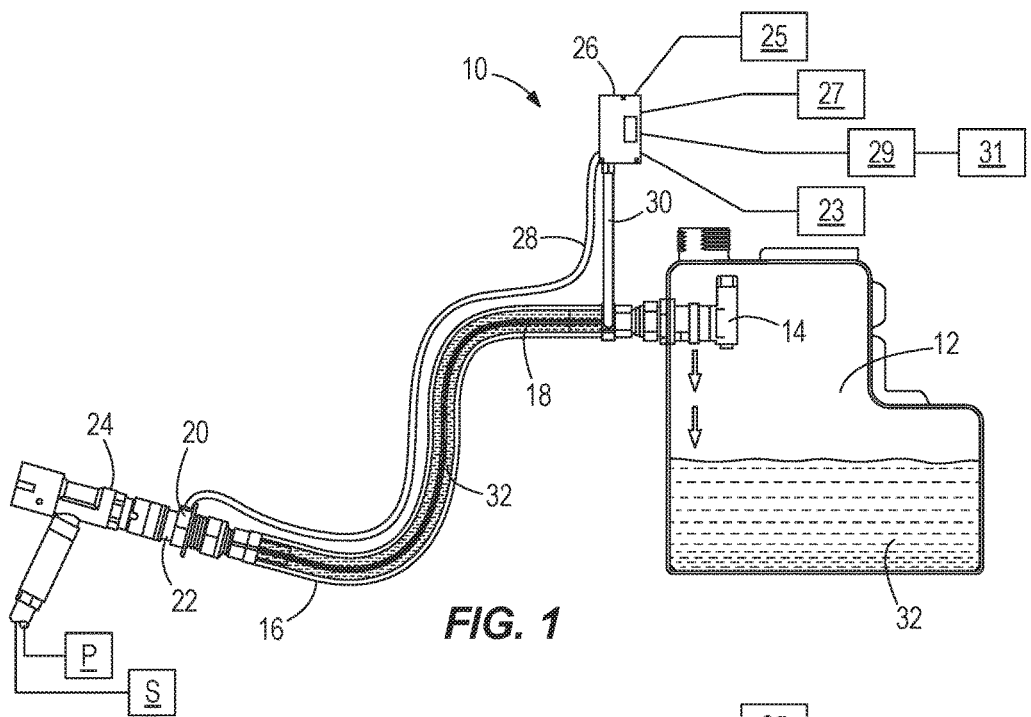
FIG. 1 is a diagram illustrating a fluid evacuation system of the present disclosure at the onset of an active fill mode with a working fluid delivered through a nozzle and inner conduit to a receiving reservoir.

Referring now to the drawings, FIGS. 1-5 illustrate a multiple action forced fluid evacuation system 10 useful in controlling fluid flow between different locations by means of a closed system. The system 10 is particularly useful in evacuating working fluid which may remain due to conduit arrangement orientation or connector retention of fluid.

The fluid evacuation system 10 is generally comprised of a rigid reservoir 12 provided with a shutoff valve 14 located therein. The shutoff valve 14 is connected to one end of an outer rigid conduit 16 which is non-expandable and non-compressible. The shutoff valve 14 is in fluid communication with one end of an inner flexible conduit 18 which is compressible and expandable and is located inside the outer conduit 16. Opposite ends of the outer conduit 16 and the inner conduit 18 are connected to a contingent/connected device in the form of a receiver 22 having a fluid sensor 20. The receiver 22 is removably coupled to a "smart" nozzle 24 which is provided with at least one of a magnet, an RF generator, a low level voltage device, a conductivity detector, an infrared LED or other transmitter that emits signals or information to the receiver 22 when the nozzle 24 is properly coupled thereto.

Detection of some or all of the signals sent from the nozzle 24 are forwarded to a processing module 26 which is operatively connected by a line 28 to the fluid sensor 20. The processing module 26 generally includes a battery or other power source, a logic controller, sensors, such as a pressure sensor 23, a pressure relief valve 25, a pressure release valve 27, and a pressure device, such as an air pump 29 connected to an air source 31 for supplying pressurized air. The processing module 26 is also connected by a line 30 to the outer and inner conduits 16, 18, respectively. The nozzle 24 is in fluid communication with a supply reservoir S and a supply pump P which provide a working or supply fluid 32 in the form of a liquid. The working fluid 32 can be selectively delivered though the nozzle 24, the fluid sensor 20 and the receiver 22 into the inner conduit 18 for delivery to the receiving reservoir 12. The fluid sensor 20 is used to detect the presence of working fluid 12 in the inner conduit 18 and the receiver 22.

FIG. 1 depicts the onset of an active fill mode for the system 10 in which working fluid 32 is delivered by the supply pump P through the nozzle 24. Flow of the working fluid 32 through the nozzle 24 sends signals to the processing module 26 to energize the pressure release valve 27 therein so that there is no air pressure in the outer conduit 16 acting on the inner conduit 18 such that there is a forced supply flow of the working fluid 32 through the inner conduit 18 for discharge into the receiving reservoir 12. The processing module 26 acts to keep the pressure release valve 27 actuated so that the working fluid 32 fills the receiving reservoir 12.

Figure 2:
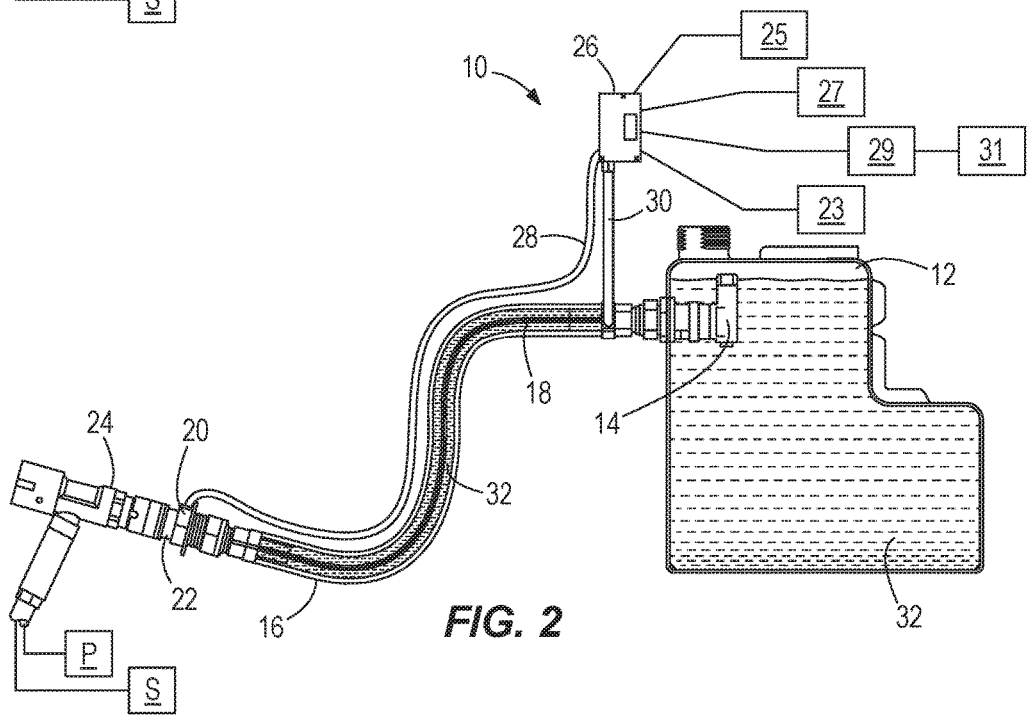
FIG. 2 is a diagram of the fluid evacuation system of FIG. 1 at the completion of the active fill mode.

FIG. 2 represents the point at which the supply of working fluid 32 has completed filling the reservoir 12 and the shutoff valve 14 responsive to the presence of working fluid 32 has signaled the nozzle 24 to stop the working fluid flow. Working fluid 32 is now trapped in the inner conduit 18, is no longer flowing, and there is no longer any supply pump pressure in the inner conduit 18.

Figure 3:
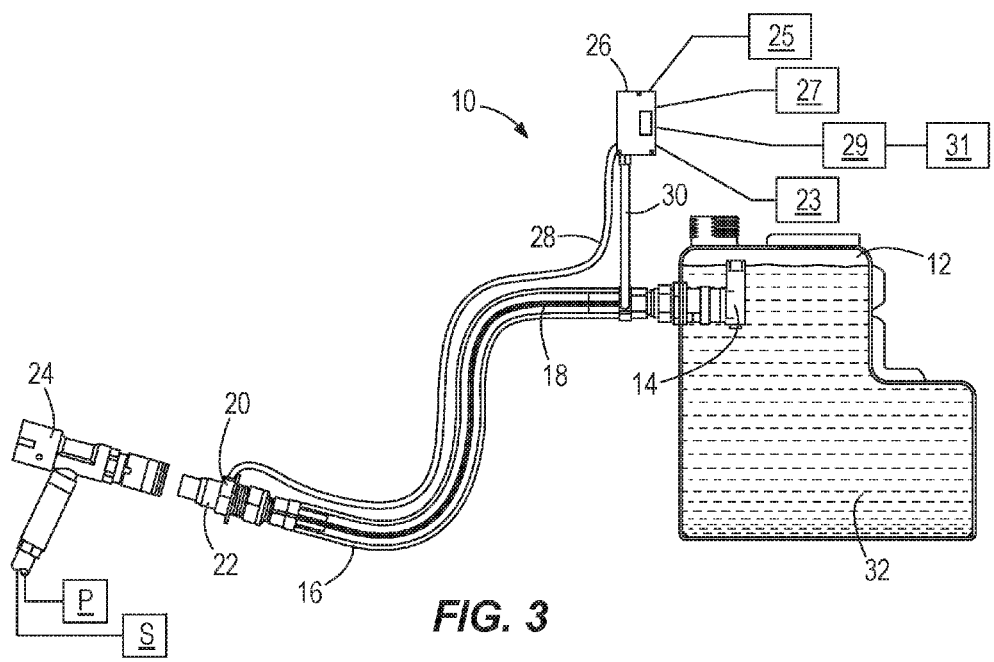
FIG. 3 is a diagram of the fluid evacuation system shown in FIG. 2 with the nozzle removed and fluid in an inner conduit initially evacuated in a first action to the receiving reservoir.
Figure 3A:
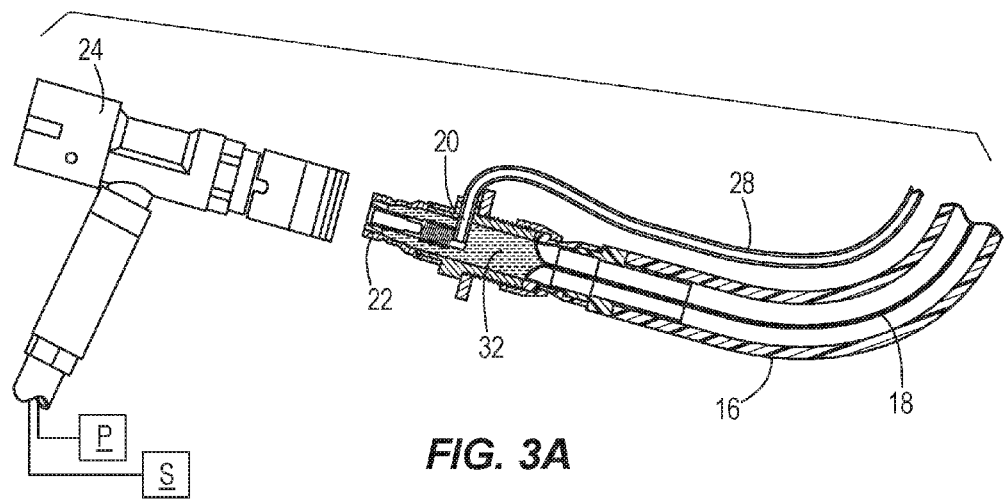
FIG. 3A is a diagram illustrating the evacuation of the inner conduit with a portion of working fluid trapped in a connected/contingent device.

As seen in FIG. 3, the nozzle 24 is now removed or disconnected from the receiver 22 which is configured to prevent any outflow therefrom. Removal of the nozzle 24 removes the signal that prevents the pressure device (air pump) 29 from activating a pressure sequence. The processing module 26 now begins a multiple action sequence. In a first evacuation action, the processing module 26 activates causing air pressure via line 30 to develop in the outer conduit 16 forcing the working fluid 32 in the inner conduit 18 to flow or evacuate into the receiving reservoir 12. After an elapsed period of time and reaching a set pressure (determined by conduit length, conduit inner diameter, supply fluid specific gravity and the size and orientation of the flow path to the receiving reservoir 12), the working fluid 32 within the length of inner conduit 18 has been forced into the receiving reservoir 12. However, there remains a portion of working fluid 32 trapped in the connected/contingent device or receiver 22 as shown in FIG. 3A.

Figure 4:
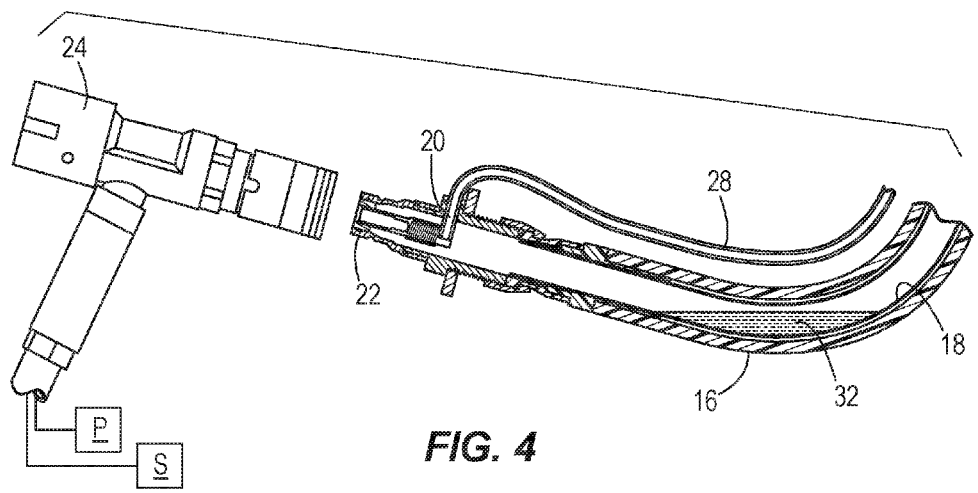
FIG. 4 is a diagram illustrating the opening of the inner conduit and the movement of the trapped working fluid from the connected/contingent device to a lowermost point in the inner conduit.

Referring to FIG. 4, the pressure release valve 27 in the processing module 26 then enables air pressure surrounding the inner conduit 18 to be relieved, and opens the working fluid 32 to atmosphere and allows the inner conduit 18 to expand, allowing air from the receiving reservoir 12 to fill the inner conduit 18. The utilization of the receiving reservoir air prevents contamination from ingression. The pressure release valve 27 also allows the working fluid 32 that was trapped in the receiver 22 to flow to the lowest point in the system 10 which, by design, lies within the inner conduit 18.

Figure 5:
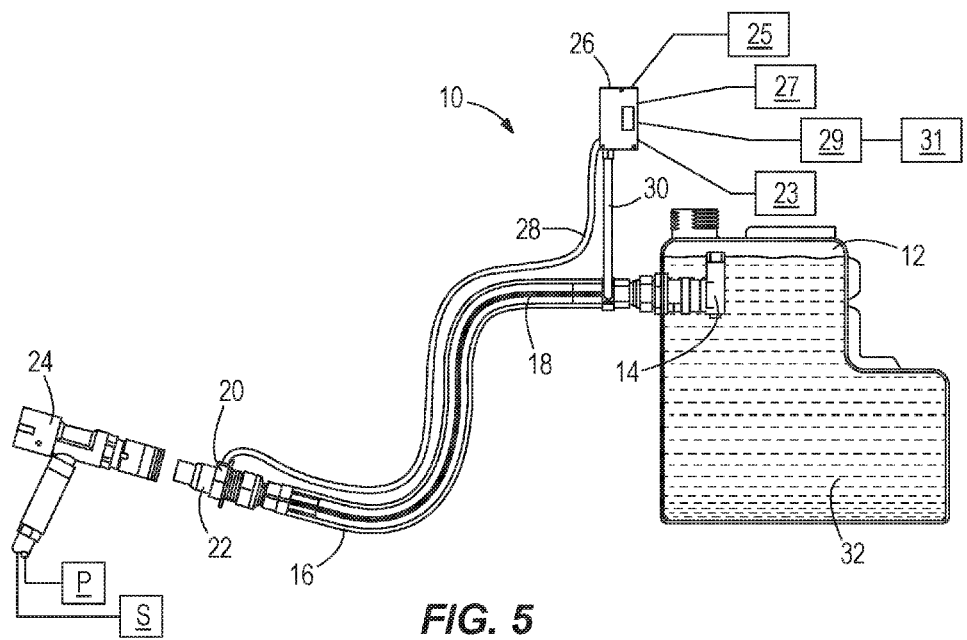
FIG. 5 is a diagram illustrating the further evacuation in a second action of the working fluid in the lowermost point of the inner conduit to the receiving reservoir.

Turning to FIG. 5, the processing module 26 then begins a second evacuation action by closing the pressure release valve 27 and generating a set pressure via the pressure device (air pump) 29. Because a volume of air/gas has displaced the working fluid 32 in the receiver 22, the working fluid 32 that flowed to the lowest point is forced up and out of the inner conduit 18 into the receiving reservoir 12 by the air pressure in the outer conduit 16 being reapplied around the inner conduit 18. Further actions may be repeated for as many times as necessary to completely evacuate the working fluid 32 into the receiving reservoir 12.

Various alternatives are contemplated as being within the scope of the following claims particularly pointing out and distinctly claiming the subject matter regarded as the invention.

What is claimed is:

1. A multiple action forced fluid evacuation system comprising:
    a reservoir for receiving a working fluid therein from a supply source;
    a shutoff valve provided in the reservoir;
    an outer rigid conduit having one end connected to the shutoff valve, and an opposite end connected to a receiver, the outer rigid conduit being in fluid communication with a fluid source supplying pressurized gas;
    an inner flexible conduit for conducting the working fluid therethrough, the inner flexible conduit having one end in fluid communication with the reservoir, and an opposite end connected to and in fluid communication with the receiver, the inner flexible conduit being disposed within the outer rigid conduit and being subjected to the pressurized gas in surrounding relationship therewith;
    a processing module for at least controlling the pressurized gas to the outer rigid conduit, the processing module being operatively connected to the outer rigid conduit and the inner flexible conduit; and
    a nozzle having one end in fluid communication with the supply source of the working fluid, and an opposite end removably coupled to and in fluid communication with the receiver, the nozzle being configured to transmit signals to the processing module, and to be responsive to an actuation of the shutoff valve,
    wherein the nozzle normally enables flow of the working fluid through the inner flexible conduit to the reservoir when the nozzle is connected to the receiver until the working fluid in the reservoir activates the shutoff valve causing the nozzle to cease flow of the working fluid from the supply source thereof leaving a portion of the working fluid trapped in the receiver and the inner flexible conduit, and wherein removal of the nozzle from the receiver actuates the processing module and causes the portion of the working fluid trapped in the inner flexible conduit and the receiver to be completely and sequentially evacuated into the reservoir.

2. The fluid evacuation system of claim 1, wherein a fluid sensor is disposed within the receiver.

3. The fluid evacuation system of claim 2, wherein the fluid sensor is connected to the processing module.

4. The fluid evacuation system of claim 1, wherein the processing module includes a pressure release valve for controlling the pressurized gas to and from the outer rigid conduit.

5. The fluid evacuation system of claim 1, wherein the processing module includes a pressure sensor for sensing pressure in the outer rigid conduit.

6. The fluid evacuation system of claim 1, wherein the processing module includes a pressure relief valve for preventing excessive pressure in the system.

7. The fluid evacuation system of claim 4, wherein the processing module is configured to energize the pressure release valve so that there is no pressurized gas in the outer rigid conduit acting on the inner flexible conduit when the nozzle enables flow of the working fluid from the supply source to the reservoir.

8. The fluid evacuation system of claim 1, wherein the processing module includes an air pump for controlling flow of the pressurized gas.

9. The fluid evacuation system of claim 1, wherein the receiver is configured to prevent outflow of the working fluid therefrom upon the removal of the nozzle.

10. A method of controlling and evacuating fluid between different locations comprising the steps of:
    a) providing a reservoir for receiving a working fluid therein from a supply source;
    b) providing a shutoff valve in the reservoir;
    c) providing an outer rigid conduit having one end connected to the receiver, the outer rigid conduit being in fluid communication with a fluid source supplying pressurized gas;
    d) providing an inner flexible conduit for conducting the working fluid therethrough, the inner flexible conduit having one end in fluid communication with the reservoir, and an opposite end connected to and in fluid communication with the receiver, the inner flexible conduit being disposed within the outer rigid conduit and being subjected to the pressurized gas in surrounding relationship therewith;

e) providing a processing module for at least controlling the pressurized gas to the outer rigid conduit, the processing module being operatively connected to the outer rigid conduit and the inner flexible conduit, and f) providing a nozzle having one end in fluid communication with the supply source of the working fluid, and an opposite end removably coupled to and in fluid communication with the receiver, the nozzle being configured to transmit signals to the processing module, and to be responsive to an actuation of the shutoff valve, wherein the nozzle normally enables flow of the working fluid through the inner flexible conduit to the reservoir when the nozzle is connected to the receiver until the working fluid in the reservoir activates the shutoff valve causing the nozzle to cease flow of the working fluid from the supply source thereof leaving a portion of the working fluid trapped in the receiver and the inner flexible conduit, and wherein removal of the nozzle from the receiver activates the processing module and causes the portion of the working fluid trapped in the inner conduit and the receiver to be completely and sequentially evacuated into the reservoir.

11. The method of claim 10, wherein a fluid sensor is disposed in the receiver, and is connected to the processing module.

12. The method of claim 11, wherein the fluid sensor is configured to sense a presence of the working fluid in the inner flexible conduit and the receiver.

13. The method of claim 10, wherein the processing module includes a pressure release valve for controlling pressurized gas to and from the outer rigid conduit.

14. The method of claim 10, wherein the processing module includes a pressure sensor for sensing pressure in the outer rigid conduit.

15. The method of claim 10, wherein the processing module includes a pressure relief valve for preventing excessive pressure in the system.

16. The method of claim 13, wherein the processing module is configured to energize the pressure release valve so that there is no pressurized gas in the outer rigid conduit acting on the inner flexible conduit when the nozzle enables flow of the working fluid from the supply source to the reservoir.

17. The method of claim 10, wherein the processing module includes an air pump for controlling flow of the pressurized gas.

18. The method of claim 10, wherein the receiver is configured to prevent outflow of the working fluid therefrom upon the removal of the nozzle.

19. The method of claim 10, wherein, in a first evacuation action, the processing module causes the pressurized gas to be delivered to the outer rigid conduit such that the portion of the working fluid trapped in the inner flexible conduit is forced into the reservoir.

20. The method of claim 19, wherein, in a second evacuation action, the portion of the working fluid trapped in the receiver flows to a lowest point in the inner flexible conduit, and the processing module again causes the pressurized gas to be delivered into the outer rigid conduit such that the portion of the working fluid in the lowest point of the inner flexible conduit is forced into the reservoir.

* * * * *